Patented June 14, 1938

2,120,431

UNITED STATES PATENT OFFICE 2,120,431

THERMAL INSULATING COMPOSITION

William L. Stafford, Plainfield, N. J., assignor to Johns-Manville Corporation, New York, N. Y., a corporation of New York No Drawing. Application March 9, 1935, Serial No. 10,338

3 Claims. (Cl. 106—9)

This invention relates to a composition of matter adapted for use as thermal insulation and to the method of making the same.

In providing thermal insulation of the loose fill type, there has been used heretofore lightweight particles of siliceous material in form reactive to fluxes. Thus, granules of diatomaceous earth have been poured onto the tops of heated equipment.

While such insulation is very effective and desirable from many standpoints, there has been objection to the tendency of the loose lightweight material to be removed as dust by currents of air and also to the lack of adherence between the constituent particles. Attempts have been made to overcome these objections, as by the addition of fluxes. For example, there have been added, at the place of shipment of the diatomaceous earth, active fluxes such as sodium silicate or the like. Such fluxes have the tendency to react and bond the material before arrival at the place of use or to give excessive fluxing and slagging action at the elevated temperatures to which the composition is subjected during use. Also, the fluxes used have had a tendency to increase excessively the overall density of the composition.

A preferred embodiment of the present invention comprises a composition of matter including granules of the type of diatomaceous earth and a mild flux therefor that is water-soluble, that is adapted to produce the desired bonding action upon the granules when subjected to the elevated temperature of use and that may be mixed with the granules at the place of their production, to give a composition adapted to be shipped to the point of use and applied to the equipment to be insulated, without intervening excessive reaction or bonding action upon the granules. The invention comprises also the method of hardening the composition upon the insulated equipment, as will be described below.

The invention will be illustrated in general by the insulation of the roof of an open hearth steel furnace, although it is understood that the method and composition are adapted for use in other industries and for other types of equipment. The insulating composition will be illustrated more specifically by the selection, as typical ingredients, of diatomaceous earth, an aluminum salt, such as an alum, and water, the latter being used to facilitate the compacting of the mixture by tamping and the subsequent interaction of the diatomaceous earth and aluminum salt.

Various sizes of particles of diatomaceous earth may be used. I have used to advantage granules largely in the range of sizes of particles adapted to be passed through a 4-mesh screen and retained on a 20-mesh screen. Granules of such size are adapted to be bonded together by a mild flux at contacting points, without fluxing of the interior of the granules. These granules may contain moisture in small proportion, say, approximately 10% or less, and, when poured loosely into a container, may weigh approximately 16 to 22 pounds to the cubic foot before being tamped or 20 to 28 pounds after being tamped.

The alum used may be any one of several compounds known by this general term, as, for example, hydrated aluminum sulphate or crystals of a potassium, sodium, or ammonium alum, preferably finely ground before use.

The alum in limited proportions is mixed with the particles of diatomaceous earth. With such a limited proportion, there is obtained eventually fluxing in amount to develop the necessary bonding effect, but not enough fluxing to give an undesirable overall density. I have used to advantage a proportion of the order of 7 parts, say 3 to 15 parts, by weight of the alum to 100 parts of the diatomaceous earth, the exact proportion to be used being determined by the properties desired in the finished composition. Thus, a smaller proportion of the alum may be used, if there is desired a decreased density with decreased bonding effect in the finished product. Conversely, larger proportions of the flux may be used if it is desired that the finished composition should show increased fluxing and bonding action.

The mixture of diatomaceous earth and alum is made intimate, but without milling or grinding of the diatomaceous earth particles to finer sizes than selected for the purpose.

Before application of the mixture of diatomaceous earth and alum or the like to equipment adapted to be operated at an elevated temperature, the mixture is moistened with water. Thus, there may be used sufficient water to give a composition suitable for being tamped and thus caused to have close contact between the granules of diatomaceous earth. For this purpose, I have used, in a typical composition, 130 to 160 parts, suitably about 150 parts, by weight of water to 100 parts of the mixture of diatomaceous earth and alum.

When the water has been incorporated into the composition, the composition is then poured or otherwise applied over the surface that is to be insulated and is made into a layer that is preferably approximately uniform in thickness, as by being tamped and then smoothed down by a trowel or other convenient tool.

The equipment is then raised to an elevated temperature, if indeed it is not already at such temperature. The temperature to which the equipment is brought should be sufficiently high to cause evaporation of the water content of the insulating composition, say, above or near the boiling point of water. In a typical installation, I have used temperatures giving to the hotter side of the insulating composition a final temperature of about 2000° F. or higher, and to the cooler side of the insulation a temperature of about 500° F. or lower, these temperatures referring to conditions when the insulation is used in thickness of layer of about 1.5 inches.

During the raising of the insulation to the elevated temperature, a number of changes occur. The flux, being water-soluble, migrates with the water being evaporated and is deposited largely at the points of final volatilization of the water, that is, over the surfaces of the individual granules of diatomaceous earth or over the exterior surface of the composition as a whole. This migration is made possible not only by the water-solubility of the flux, but also by its mild activity as a flux, there being adequate time for the migration before the flux completes its reaction with the material of which the granules are composed. Once deposited from solution in the water, there is then time for the reaction between the flux and the material of the granules. This reaction gives ultimately proper bonding together of the granules as well as an exterior surface that is harder than the interior parts of the composition. In other words, hardness is obtained where most desired, with the establishment of a surface crust or case-hardened effect and preservation of the relatively low density or lightweight condition of the interior or main portion of the insulating product. Also, the particles of thermal insulating material in the interior of the said product constitute a layer that conforms to the roof or other part of a furnace over which the said layer is disposed and that may readily be reclaimed for reuse, since these particles are not bonded together.

Although the alums have been found to be particularly satisfactory as the mild water-soluble flux for reacting with the surface portions of the particles of lightweight reactive material, to give the binder appearing in the finished product, other similar fluxing agents may be used, particularly when the optimum results as to lightness of weight and bonding effect are not necessary. Thus, there may be used one or more fluxes of the type of alum, such as a chloride, sulphate or salt of another volatile acid with iron, calcium, magnesium, zinc or the like. In general, the preferred flux should be not only water-soluble and mild in its reaction upon the lightweight siliceous material but also adapted to form, with the said siliceous material, at least a small proportion of silicate, with attendant loss of the volatile acid component of the salt originally used.

It is to be understood that the invention is not limited to any theory of explanation of the results obtained. Whether the bonding effect of the chemicals used is due largely to fluxing or chemical reaction with the particles of lightweight material or to physical effects, I utilize all of the results giving effective bonding, minimized tendency to dusting and hardening of the resulting composition, the term "reaction" including all such results and effects, physical and/or chemical.

The term "elevated" as applied to temperature refers to any temperature, above atmospheric, adapted to cause bonding of the siliceous particles by the flux or bonding agent of the type described.

The details that have been given are for the purpose of illustration, not restriction, of the invention. It is intended, therefore, that variations within the spirit of the invention should be included within the scope of the appended claims.

What I claim is:

1. A thermal insulating layer comprising contacting granules of diatomaceous earth and a binder therefor, the binder being contained mainly in the outer surface portion of the layer, bonding together the granules in the said portion, and embodying the product of the reaction at an elevated temperature of a limited proportion of a mild silica flux and diatomaceous earth, and the granules inside the said layer being substantially not bonded to each other.

2. A composition of matter, adapted to be mixed with water for use as a thermal insulating coating on roofs of open hearth furnaces and the like, comprising an intimate mixture of alum and granules of diatomaceous earth largely of size adapted to be passed through a 4-mesh screen and retained on a 20-mesh screen, the proportion of alum being 3 to 15 parts by weight to 100 parts of the diatomaceous earth.

3. A composition of matter adapted to be mixed with water for use as a thermal insulating coating on roofs of open hearth furnaces and the like, comprising an intimate mixture of granules of diatomaceous earth and a flux for silica selected from the group consisting of the chlorides and sulphates of iron, calcium, magnesium, zinc, and aluminum, the flux being present in the proportion of about 3 to 15 parts by weight to 100 parts of the diatomaceous earth.

WILLIAM L. STAFFORD.